March 24, 1959     E. L. HALLADAY     2,879,104
UNIVERSAL DOOR EDGE MOULDING
Filed July 6, 1956
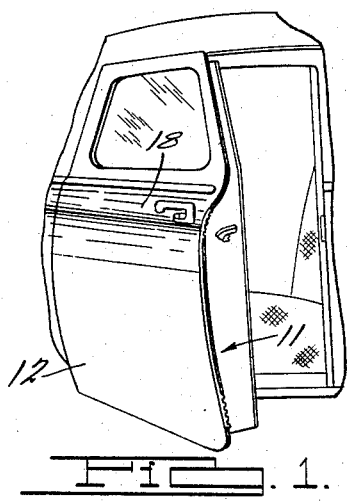
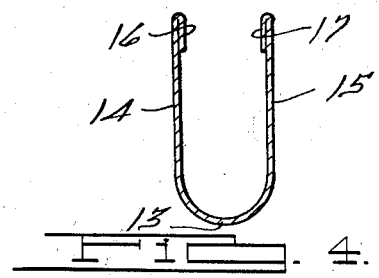
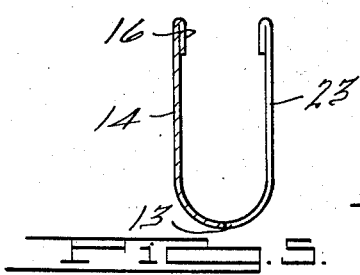
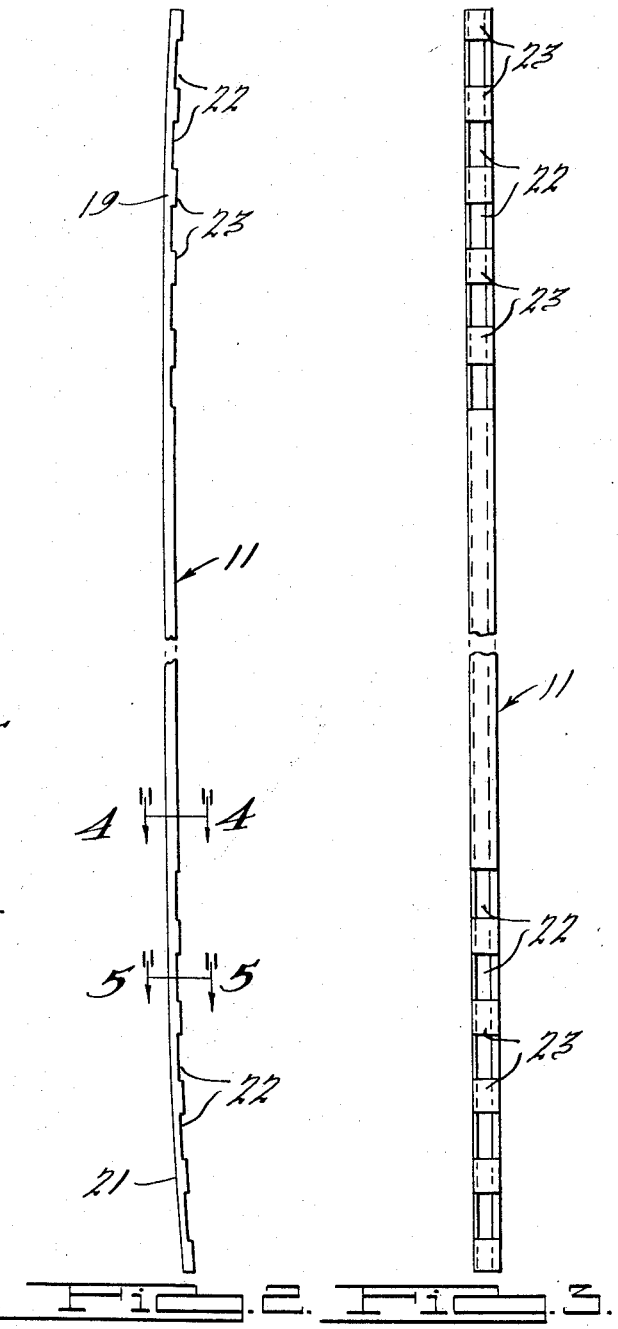
INVENTOR,
Earl L. Halladay
BY
Harness, Dickey & Pierce
ATTORNEYS.

United States Patent Office 2,879,104
Patented Mar. 24, 1959

2,879,104

UNIVERSAL DOOR EDGE MOULDING

Earl L. Halladay, St. Clair Shores, Mich.

Application July 6, 1956, Serial No. 596,195

5 Claims. (Cl. 296—44)

This invention relates to mouldings, and more particularly to edge mouldings of the type used as trim on the outer edges of automotive vehicle doors and the like for decorative appearance and protection against paint chip marks.

It is an object of the invention to provide an improved door edge moulding of the above character, which is of universal application to different shapes and curvatures of door edges, thus eliminating the need for the manufacture and stocking of a large number of mouldings of different shapes to suit various styles of car bodies.

It is another object to provide an improved universal trim moulding having the above characteristics, which is relatively easy to install and will maintain a firm engagement with the door edge along all portions of its extent.

Other objects, features and advantages of the present invention will become apparent from the subsequent description, taken in conjunction with the accompanying drawings.

In the drawings:

Figure 1 is a perspective view showing the open front door of an automotive vehicle with the novel trim moulding of this invention mounted thereon;

Figure 2 is a view in elevation of the novel moulding looking in the direction of the plane of the door and showing the location of the notches;

Figure 3 is a side elevational view of the moulding shown in Figure 2, showing the width and location of the retaining lugs in the notched areas;

Figure 4 is a cross-sectional view taken along the line 4—4 of Figure 3 and showing the cross-sectional configuration of the main portion of the moulding; and Figure 5 is a cross-sectional view taken along the line 5—5 of Figure 2 and showing the cross-sectional shape of a notched moulding portion.

The novel trim moulding comprising the invention is generally indicated at 11 and is adapted to be mounted on the outer or free edge of a door 12 of an automotive vehicle or the like. Moulding 11 comprises an elongated strip having a generally U-shaped cross-sectional configuration, and may be manufactured of an appropriate material such as stainless steel which will present a pleasing and decorative appearance when in place, and will match the other portions of the vehicle trim. The length of strip 11 may be appropriately selected in accordance with the length of the door edge to which it is to be applied, and this length will normally be such as to extend from the vicinity of the door handle or belt line of the vehicle downwardly to the beginning of curvature in the lower corner of the door. The central or connecting section 13 of the U-shaped cross section, as indicated in Figure 4, is preferably rounded, and the spacing between the outer leg 14 and the inner leg 15 is so selected that the moulding will spring slightly when applied to the door edge so as to firmly grip the adjacent door surfaces. Legs 14 and 15 are provided with inwardly bent flanges 16 and 17 respectively, to provide smooth edges for the moulding and further assist in gripping the door edge.

In applying mouldings of this type to present day automobiles, problems have been encountered because of the widely varying body contours below the belt line among different makes and models. In particular, the cross-sectional configuration of presently known types of trim mouldings make it difficult to bend and fit such mouldings to bulged or protuberant shapes such as that indicated by the reference numeral 18 in Figure 1, which shapes are incorporated with varying degrees of convexity in modern cars.

In accordance with the present invention, this problem is overcome by providing upper and lower sections 19 and 21 respectively on moulding 11 which may be easily bent to fit the curvature of an individual door edge. The means for accomplishing this result includes the provision of a plurality of spaced notches 22 in the inner leg 15 of the moulding along sections 19 and 21 thereof, leg 15 being that which engages the inner surface of the door edge upon installation. Notches 22 are formed of an appropriate depth and length and with a spacing so selected that the gripping portions or lugs 23 between the notches are sufficient to provide proper fastening means for the strip. The depth of notches 22 is preferably such that, while substantially all the metal of inner leg 15 is removed in the notched areas, the notches will be invisible to an outside observer when the door is closed, and this depth is shown in the illustrated embodiment as being approximately to the midportion of central leg 13.

Due to the presence of notches 22, sections 19 and 21 of the moulding may be easily bent by hand to conform to any particular door edge curvature, without danger of buckling or overstressing any portion of the moulding. During this process, the bending will take place primarily between lugs 23, and the spacing of the lugs should therefore be such as to enable the moulding to conform to door edges of high curvature found in some present day automobiles. It should be noted that with the construction provided by the present invention the bending will not interfere in any way with the gripping action of the moulding on the door edge. The presence of notched sections 19 and 21 at both ends of the moulding strip will enable the strip to be bent to accommodate curvatures at both the upper and lower portions of the door edge, and will also permit the moulding strip to be used for both right and left hand doors. It should also be noted that the moulding could be bent to conform to concave door shapes as well as the convex shapes found on most present-day models.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a door trim moulding for the outer edges of automotive vehicle doors, a metal strip having a U-shaped cross-sectional configuration and including an outer leg adapted to engage the outer surface of the door, an inner leg adapted to engage the inner surface of the door and a rounded central section interconnecting said legs, said legs of said U being so shaped as to firmly grip a door edge, and a plurality of spaced notches along at least one end portion of said inner leg, said notches being so formed as to substantially remove the metal of said inner leg in spaced areas along said end portion, said notches entering only partially into said rounded central section of said strip, whereby said end portion of the strip may be bent laterally toward said inner leg to conform to the curvature of the door edge, the penetration of said notches into said central section being sufficiently shallow as to substantially prevent the notches from being visible to an outside observer when the strip is mounted on a vehicle door and the door is closed.

2. In a door edge moulding, a strip formed of a bendable material, said strip having a U-shaped cross-section and including an outer leg adapted to engage the outer surface of the door, an inner leg adapted to engage the inner surface of the door and a rounded central section interconnecting said legs, said legs of said U being so spaced as to firmly grip a door edge, and a plurality of spaced notches along opposite end portions of said inner leg, said notches being so formed as to substantially remove the material of said inner one outer leg of the U and partially remove the material of said central section of the U in spaced areas along said end portions, whereby said end portions may be bent laterally toward said inner leg without buckling or overstressing the material, the penetration of said notches being approximately to the midpoint of said central section so that when the strip is mounted on a vehicle door said notches will be substantially invisible to an outside observer when the door is closed.

3. The combination according to claim 2, the width of said notches being at least as great as the width of the sections remaining between said notches.

4. A universal door trim moulding adapted to be mounted on the vertical edge of any of a plurality of automotive vehicle doors each of which vertical edges includes a middle portion and upper and lower portions, the middle portions being of generally the same curvature, said door trim moulding comprising a metal strip having a generally U-shaped configuration in cross-section and including an outer leg adapted to engage the outer surface of the door, an inner leg adapted to engage the inner surface of the door and a rounded central section interconnecting said legs; said legs being adapted to grip a door edge, said metal strip having a central portion adapted to fit said middle portions of said vertical door edges and having upper and lower end portions having a plurality of spaced notches extending through said inner leg and extending partially through said central section so that said notches will be substantially invisible to an observer when the strip is mounted on a door and the door is closed while permitting said upper and lower end portions to be bent laterally toward said inner leg to conform to the curvature of the door edge without buckling or overstressing the material.

5. In a door trim moulding for the outer edges of automotive vehicle doors, a metal strip having a U-shaped cross-sectional configuration and including an outer leg adapted to engage the outer surface of the door, an inner leg adapted to engage the inner surface of the door and a rounded central section interconnecting said legs, said legs of said U being so shaped as to firmly grip a door edge, and a plurality of spaced notches along at least one portion of said inner leg, said notches being so formed as to substantially remove the metal of said inner leg in spaced areas along said portion, said notches entering only partially into said rounded central section of said strip, whereby said portion of the strip may be bent laterally toward said inner leg to conform to the curvature of the door edge, the penetration of said notches into said central section being sufficiently shallow as to substantially prevent the notches from being visible to an outside observer when the strip is mounted on a vehicle door and the door is closed.

References Cited in the file of this patent

UNITED STATES PATENTS

| | | |
|---|---|---|
| 1,523,285 | Pritchett | Jan. 13, 1925 |
| 2,733,097 | Stevens | Jan. 31, 1956 |